Feb. 6, 1934.   H. M. QUACKENBUSH   1,945,995
BOWL
Filed Nov. 2, 1932
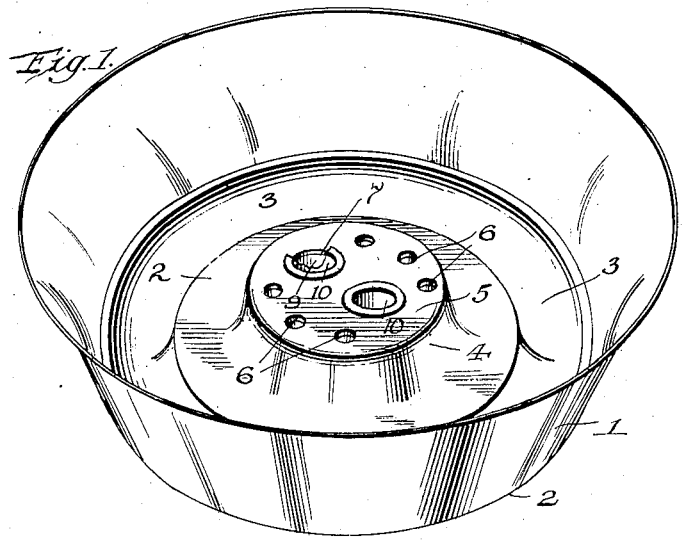
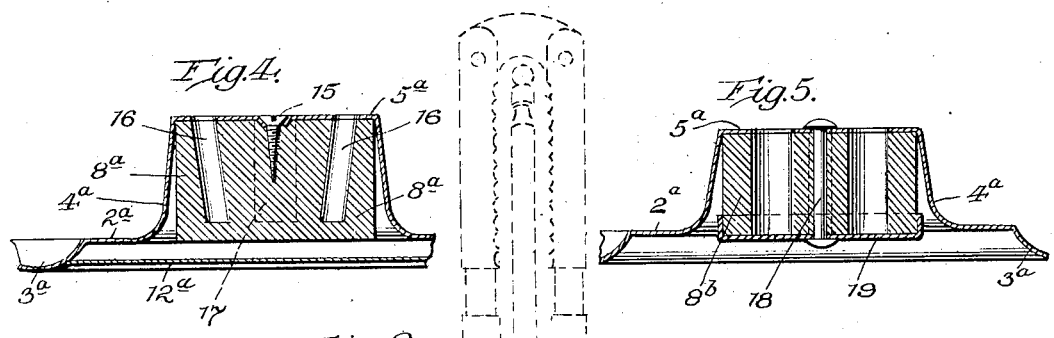
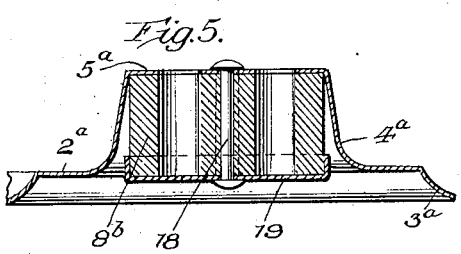
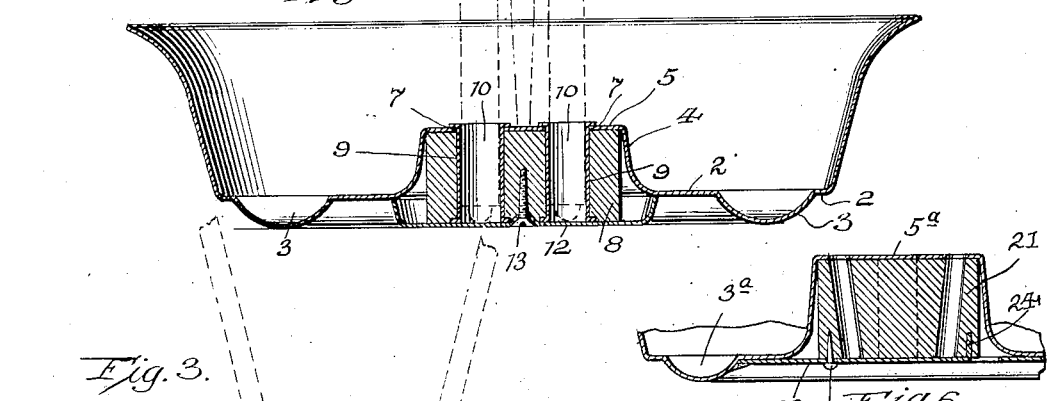
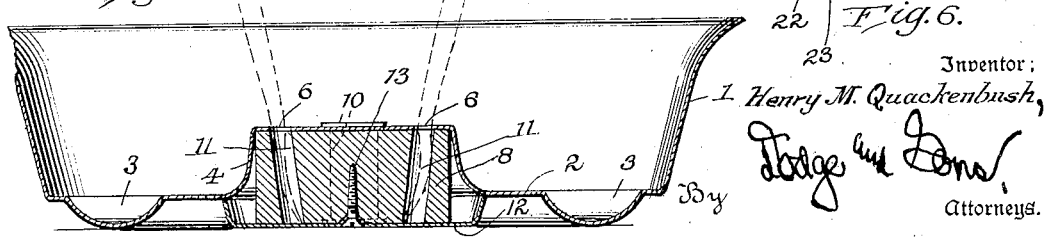
Inventor:
Henry M. Quackenbush,
By Dodge and Sons
Attorneys.

Patented Feb. 6, 1934

1,945,995

UNITED STATES PATENT OFFICE 1,945,995

BOWL

Henry M. Quackenbush, Herkimer, N. Y.

Application November 2, 1932. Serial No. 640,867

8 Claims. (Cl. 65—15)

This invention pertains to an improved form of bowl and more particularly to a bowl designed primarily to hold nuts, the structure presenting means whereby a nut cracker and nut picks may be held or sustained thereby in such position that they may be readily grasped and removed and as readily replaced.

Broadly stated such a structure is covered by Letters Patent to Davis, Number 1,277,200, dated August 27th, 1918. As in said patent, the present structure presents a bowl proper with an upstanding post provided with openings or pockets for the reception of the handles of a nut cracker of the pincer type and the ends of the nut picks.

The object of the present invention is to form the bowl and post from sheet metal and to house and secure within the post a filler block or body having recesses registering with openings in the upper face of the post for the reception of the implements just above mentioned.

The block securing means in the preferred form of the invention, extends through and forms a liner for those openings into which the handles of the nut cracker are placed.

Such a bowl is shown in the annexed drawing wherein:

Fig. 1 is a perspective view of the bowl as seen from the upper side, a portion of one of the connecting elements hereinafter to be referred to being broken away;

Fig. 2, a transverse vertical sectional view taken through the center of the fastening elements hereinafter to be referred to which form sockets for the reception of the ends of the handles of a nut cracker;

Fig. 3, a like view taken at right angles to that shown in Fig. 2; and

Figs. 4, 5 and 6 detail vertical sectional views showing modifications of the structure.

The bowl (Figs. 1 to 3), the body whereof is formed from a single piece of sheet metal, may be said to comprise a main body or side 1, the upper edge whereof is preferably flared in an outward direction, a bottom 2 formed with an annular outwardly projecting curved portion or bead 3 which extends around the bottom of the bowl adjacent the lower portion of member 1 and forms the base upon which the bowl rests. Inward of the member 3 the metal of the structure is so shaped as to form an upwardly extending boss or post-like member 4, the upper end of which is normally defined by a transverse portion 5.

The bowl thus far described is produced from a single sheet of metal pressed to shape or formed in any desired manner.

The top member 5 is provided with a series of openings 6 arranged adjacent the edge thereof and is likewise formed with two larger openings, as 7. The purpose of these various openings will presently appear.

Mounted within the hollow post 4 is a block 8, preferably formed of wood and having two parallel openings 9 extending therethrough in alignment with the openings 7 and of the same dimensions as said openings. Extending through the openings 7 and through each of the openings 9 in the block is a tubular member 10, the upper end whereof is flanged over the top 5 while the lower end thereof is flanged and embedded in the lower face of the block 8. These tubular members, or tubular rivets 10, secure the block 8 firmly to the bowl within the post 4 and likewise produce pockets for the reception of the free ends of a nut cracker as indicated in dotted lines in Fig. 2.

The block 8 (see Fig. 3) is likewise provided with a plurality of openings 11, which openings align with the openings 6. The openings or holes 11 are inclined from the bottom outwardly so that a nut pick, such as is indicated in Fig. 3, when positioned in said openings 6 and the holes or openings 11, will stand at an inclination away from the nut cracker where it may be readily grasped for removal and use.

To provide a closure for the lower end of the openings or passages 11, and to likewise produce a neat finish upon the under face of the bowl, a cap piece, cup shape in form and denoted by 12, overlies the lower end of the post and is secured thereto by a screw 13.

The cap or plate 12, where the screw passes into the same, is provided with a countersunk opening to receive the head of the screw so that the same will be flush with the outer face of the cap.

As will be seen upon reference to Figs. 2 and 3, the diameter of the cap 12 is such that its upwardly extending wall contacts the under face of the base or bottom 2 outwardly of the post 4. In other words at a point in the bottom 2 which is flat. The lower outer face of the cap 12 is in the same plane as the outer face of the bead or member 3 so that when the bowl is placed upon a flat surface the cap and the bead will form the support for the bowl. It is not essential that the block 8 and the finish cap 12 be of such depth as to lie in the same plane with the bead 3 but they should not extend beyond such plane.

The manner of securing the block within the hollow post and finishing the under side of such block and the bowl may be varied and several variations are shown in Figs. 4, 5 and 6.

Referring first to Fig. 4, and the modification shown therein, the bowl and the post are of the same form as heretofore described and the parts are designated by the same reference numeral with the exponent "a" added thereto. The block 8ª is secured within the hollow post 4ª by a screw 15 which passes through an opening formed in the top 5ª of the post.

The block is provided with sockets or recesses which stop short of the bottom thereof, which sockets or recesses are aligned with openings formed in the top 5ª for the reception of the ends of the nut cracker and also for the reception of the picks. The pick-receiving sockets are denoted by 16 and one of the sockets for receiving the handle end of the nut cracker is denoted by 17 and is shown in dotted lines. Both of these, as will be seen, stop short of the bottom of the block 8ª.

Instead of securing the finish plate to the under face of the block, as in the construction heretofore described, such finish plate, which is designated by 12ª, is of such a diameter or size as to fit within the lower portion of the inner wall of the bead element 3ª. It may be secured in place by spot welding or in any other desired manner. It is to be noted that inasmuch as the openings in the block 8ª do not extend entirely through the same it is not essential that the plate 12ª contact the lower face thereof.

In Fig. 5 a block, as 8ᵇ, is secured in place within the post 4ª by a rivet 18 which extends through the post top 5ª and through a cap piece or plate 19 placed against the lower end of the block 8ᵇ. The openings for the reception of the various instrumentalities in this instance extend through the block 8ᵇ and the plate 19 forms a stop for the ends of such instrumentalities.

In Fig. 6 a still further modification is shown. The body of the bowl and the post are the same as heretofore described and are denoted by the same reference letters with the exponent "a" added thereto.

The block, which is seated in the post, is denoted by 21 and is provided with the openings for the reception of the desired instrumentalities which are in register with the holes formed in the element 5ª of the post. In this instance the block is held in position by a cover and finish plate 22 which bears directly against its lower end and at its margin is secured to the adjacent wall of the bead 3ª.

If desired, a pin, as 23, may be driven into the block 21 to hold it against rotative movement within the post and thus maintain alignment of the openings in the block with the corresponding openings in the member 5ª. Instead of the pin the plate might have spurs, as 24, struck therefrom which would be driven into the block upon placement of the cover plate 22.

It will be appreciated, of course, that the eyelet or tubular rivet construction may be employed with the form shown in Fig. 6 or in fact with any form.

What is claimed is:

1. In a receptacle for fruit and nuts, the combination of a metallic bowl having a hollow post extending upwardly from the bottom thereof and formed integrally therewith and being open at its lower end and having its upper end substantially closed; a block located within said post; and means for securing said block in place, said block and the upper end of the post having aligned openings therein for the reception of desired instrumentalities.

2. A structure as set forth in claim 1, wherein a finish plate or cap is secured to the underside of the block.

3. A structure as set forth in claim 1, wherein at least one of the openings in the block extends therethrough and a tubular metallic member extends through said opening and through an opening formed in the upper wall of the post and has its ends flanged thereby securing the block in place.

4. A structure as set forth in claim 1, wherein the upper end of the post is formed with at least two spaced openings and the block with registering openings extending through the same, and a tubular member is mounted in each of the block openings, the members being of a length to extend entirely through said openings the ends thereof being flanged to secure the parts in place.

5. In a nut and fruit receptacle, the combination of a metallic bowl having a hollow post extending upwardly from the bottom thereof and open at its lower end; a block located within said post, said block having a pair of spaced and vertically disposed openings extending therethrough and also having a series of smaller openings likewise extending therethrough, all of said openings registering with like openings formed in the upper end of the post; and a tubular member mounted in each of said first named openings and through the corresponding openings in the post, said members being flanged to secure the block within the post.

6. A structure as set forth in claim 5, wherein a cup-shaped finish and stop plate is secured to the lower face of the block and the edge thereof contacts the bottom of the bowl.

7. In a receptacle for nuts and fruit, the combination of a metallic bowl having a hollow post extending upwardly from the bottom thereof, said post being open at its lower end and the upper end substantially closed; a block located within said post, said block and the upper end of the post having aligned openings therein for the reception of desired instrumentalities; and a finish plate secured to the under face of the bowl and extending beneath the lower open end of the post and the lower end of the block.

8. A structure as set forth in claim 7, wherein the finish plate closes the lower ends of the openings formed in the block and thereby functions as a stop plate.

HENRY M. QUACKENBUSH.